(12) United States Patent
Crickmore et al.

(10) Patent No.: US 10,422,677 B2
(45) Date of Patent: Sep. 24, 2019

(54) FLUID INFLOW

(71) Applicant: OPTASENSE HOLDINGS LIMITED, Farnborough, Hampshire (GB)

(72) Inventors: Roger Crickmore, Farnborough (GB); Andrew Ridge, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 339 days.

(21) Appl. No.: 15/307,562

(22) PCT Filed: May 8, 2015

(86) PCT No.: PCT/GB2015/051357
§ 371 (c)(1),
(2) Date: Oct. 28, 2016

(87) PCT Pub. No.: WO2015/170113
PCT Pub. Date: Nov. 12, 2015

(65) Prior Publication Data
US 2017/0052049 A1 Feb. 23, 2017

(30) Foreign Application Priority Data

May 8, 2014 (GB) .................................. 1408131.9

(51) Int. Cl.
*G01V 1/40* (2006.01)
*G01F 1/696* (2006.01)
(Continued)

(52) U.S. Cl.
CPC ............ *G01F 1/696* (2013.01); *E21B 47/065* (2013.01); *E21B 47/102* (2013.01);
(Continued)

(58) Field of Classification Search
None
See application file for complete search history.

(56) References Cited

U.S. PATENT DOCUMENTS 6,618,677 B1 9/2003 Brown
8,942,703 B2 1/2015 Jo et al.
(Continued)

FOREIGN PATENT DOCUMENTS

CN 101818640 9/2010
CN 202483554 10/2012
(Continued)

OTHER PUBLICATIONS

Ouyang L-B et al., "Flow profiling by distributed temperature sensor (DTS) system—expectation and reality", SPE Production & Operations: An Official Publication of the Society of Petroleum Engineers, vol. 21, No. 2, May 1, 2006, pp. 269-281.

*Primary Examiner* — Aditya S Bhat
(74) *Attorney, Agent, or Firm* — McDonnell Boehnen Hulbert & Berghoff LLP

(57) ABSTRACT

Methods and apparatus for determining fluid inflow to a well are described. In one example, a method comprise determining a first fluid flow velocity profile from slug tracking and determining a second fluid flow velocity profile from an estimate of fluid inflow at each of a plurality of perforations in a well. The first and second fluid flow velocity profiles are combined to provide a combined velocity profile. An indication of fluid inflow at least one perforation is derived from the combined velocity profile.

24 Claims, 8 Drawing Sheets

(51) Int. Cl.
  *E21B 47/06* (2012.01)
  *E21B 47/12* (2012.01)
  *G01F 1/704* (2006.01)
  *G01F 1/66* (2006.01)
  *E21B 47/10* (2012.01)

(52) U.S. Cl.
  CPC ............ *E21B 47/123* (2013.01); *G01F 1/661* (2013.01); *G01F 1/704* (2013.01)

(56) References Cited

U.S. PATENT DOCUMENTS

| | | | |
|---|---|---|---|
| 9,215,718 B2 | 12/2015 | Jo et al. | |
| 9,927,270 B2 * | 3/2018 | Xie | G01F 1/363 |
| 2008/0314142 A1 * | 12/2008 | Davies | E21B 47/042 |
| | | | 73/295 |
| 2011/0284217 A1 | 11/2011 | Brown | |
| 2019/0085879 A1 * | 3/2019 | Frohnapfel | F15D 1/001 |

FOREIGN PATENT DOCUMENTS

| | | |
|---|---|---|
| CN | 102943620 | 2/2013 |
| WO | 2004/076815 | 9/2004 |
| WO | 2012/137021 | 10/2012 |
| WO | 2013/045941 | 4/2013 |

\* cited by examiner

FLUID INFLOW

FIELD OF THE INVENTION

This invention relates to fluid inflow, in particular but not exclusively to fluid inflow in a well bore of a hydrocarbon well such as an oil or gas well.

BACKGROUND OF THE INVENTION

In hydrocarbon production, there is often a desire to accurately track fluids within a well. This is useful for the efficient running of a well, for example to determine how various portions of the well are contributing to the overall production. In addition, it may be that different entities own different reservoirs which are accessed by a common well bore. Understanding fluid flow in the well allows the earnings of particular owners to be determined according to the volume of hydrocarbon produced from that reservoir.

As will be familiar to the skilled person, the desired hydrocarbon (oil, gas, etc), is not the only fluid in a well. Other fluids, such as water, will also be found. Indeed, water control is often a key concern for well operators. The water must be separated out from the desired hydrocarbon, before usually being chemically treated and returned to the ground, all of which adds to operational costs. Where the water volume exceeds a certain level, a well may become economically unviable. In certain gas wells, water may also inhibit or stop flow where the gas pressure is too low to push the water out.

Access from a wellbore to a hydrocarbon reservoir can be via one or more perforations in the wall of a wellbore casing. Where the volume of water inflow from a particular perforation is significant (or significant in comparison to the amount of hydrocarbon), the perforation may be deemed to have become 'watered out', and blocking off the perforation may increase the well profitability. However, it is often difficult to determine which perforations are contributing excessively to the water content in a well.

Known production logging tools to monitor flow within a well include flow meters such as turbine meters, or 'spinners', which are placed inside a functioning well to measure the velocity of fluid flow based on the speed of rotation of a spinner. Unfortunately, the relationship between the spinner's speed of rotation and the actual fluid flow are complex due to friction and fluid viscosity and at lower flow velocities a spinner may not function at all. Also, such spinners interfere with flow and often provide confusingly different measurements when being inserted and withdrawn. Further, it is not easy to distinguish between different fluids using spinners.

There are other flow meters, such as gas orifice meters, ultrasonic flow meters, Coriolis meters, etc. which have associated advantages and drawbacks. However, all such meters are subject to damage from their hostile operating environment, require careful calibration and impede flow.

In addition, multiphase meters, which are capable of distinguishing between liquids and gases (which could be gas, oil and/or water) are also known. Again, such meters are subject to harsh environments and may not be able to isolate the contributions from individual perforations.

All such methods require well intervention, with associated safety concerns, and well down-time, and are only capable of providing a 'snapshot' in time. Using optical fibres to estimate the temperature of a well and imply flow rates therein is also known, for example from U.S. Pat. No. 6,618,677. However, the method described therein relies on a complex model and requires a well 'shut in' before the method may be employed.

SUMMARY OF THE INVENTION

According to a first aspect of the invention, there is provided a method of determining fluid inflow at a plurality of perforations in a well, the method comprising:
- determining a first fluid flow velocity profile from slug tracking;
- determining a second fluid flow velocity profile from an estimate of fluid inflow at each of a plurality of perforations in a well;
- combining the first and second fluid flow velocity profiles to provide a combined velocity profile;
- deriving, from the combined velocity profile, an indication of fluid inflow at at least one perforation.

Fluid velocity within a well can be used to provide an indication of fluid inflow, and vice versa. A well may have a number of perforations, all of which may contribute fluid. As the volume of fluid rising up a well increases, so, in general, does the flow speed. The fluid velocity in a well at a point generally has a relationship to the volume of fluid that has entered the well lower down, and to a reasonable approximation is proportional thereto (the skilled person will understand that there are additional factors, such as gases expanding or liquid components vapourising at a reduced pressure, which could be considered in a more complex model, but to a first approximation can be ignored).

Fluids entering and/or passing through a well cause a variety of effects such as pressure variations, temperature variations, turbulence or vibrations within the well. Detection of such effects can be used to provide what is termed herein a 'flow signal'.

In some examples, a flow signal may be due to the passage of one or more 'slugs', i.e. regions of different fluid compositions moving through a well. The slugs can cause turbulence, pressure variations, temperature variations, vibrations and the like, all of which may contribute to a flow signal. 'Slug tracking' may comprise determining the velocity of at least one slug in the well.

Slugs moving along a well bore can be observed using a fibre optic distributed sensing system, for example using the principles of Distributed Acoustic Sensing (DAS) of detecting variations in Rayleigh backscattering of interrogating radiation (as described in greater detail herein after). A slug may be associated with a flow signal in a particular frequency band (which may vary between wells depending on a range of factors including well type, production rate and fibre deployment method), while other frequency bands may be less affected, or broadly unaffected, by a slug. In some examples, the frequency band may be identified by considering a plurality of frequency bands and identifying the band in which a flow signal associated with a slug is sufficiently, or in some examples, most readily apparent. In some examples, an acoustic or temperature based flow signal which is characteristic of an individual slug can be tracked as it moves through a well bore.

For example, a slug may cause temperature fluctuations, which can be in the order of milliKelvin, if the fluid inside the slug has different thermal properties to surrounding fluids. For example, as liquids generally have a higher specific heat capacity and thermal transfer coefficient than gas, for a given temperature difference, a given volume of liquid in a well generally has a greater cooling/heating effect than the same volume of gas.

The combined velocity profile uses both the first fluid velocity profile, determined using slug tracking, with the second fluid velocity profile, which is linked to the inflow from individual perforations. Each of the first and second velocity profiles may be associated with strengths and limitations in association with their accuracy and applicability, as discussed hereinafter, but the combined profile may allow a more accurate velocity profile to be determined, which can then be used to provide an improved estimate of inflow at an individual perforation.

In some examples, determining the first fluid flow velocity profile comprises tracking a flow signal due to a slug as the slug moves up a well. In one example, the flow signal may be indicative of temperature excursions. For example, temperature profiles of a well can be captured over time using a fibre optic technique such as distributed temperature sensing (DTS) relying on Brillouin or Raman scattering, which is temperature dependent, or using techniques which are analogous to those used in Distributed Acoustic Sensing (DAS), which rely on Rayleigh backscattering from intrinsic scattering sites (minor imperfections and the like) which are dispersed throughout the fibre. As a slug is likely to be different temperature to the background temperature of a well, each slug will create a disturbance in a well temperature profile and these can be tracked moving up the well.

In other examples, frequency bands which are associated with effects other than temperature could be used for slug tracking, and a feature in such a profile, for example associated with an increased acoustic signal, may be tracked as it moves up the well over time. In general, this may comprise monitoring the signal energy in a frequency band and tracking a feature having a characteristic energy as it moves through the well.

If a slug is moving up a well, and passes a perforation which contributes a significant amount of fluid, the slug velocity will increase. Over a well, the velocity of a single slug may increase on a curve, the gradient of which depends on the fluids entering a well.

Although inflow models based on slug tracking provide a reasonable estimate of mean inflow when averaged over a number of perforations, they are not particularly suited to identifying the inflow at a single perforation, particularly if several perforations are closely spaced.

In some examples, determining the second fluid flow velocity profile comprises:
  determining a flow signal within a frequency band near a perforation;
  relating the flow signal to fluid inflow;
  and determining from the fluid inflow, an estimated fluid flow velocity profile.

In some examples, the frequency band may be determined on the basis that there is a more significant signal at at least one perforation than away from the perforation in that frequency band. Alternatively or additionally, the frequency band many be determined on the basis a signal in that frequency band that it exhibits variation with production rate (which may in some examples be confirmed, for example with use of other production logging tools). This frequency band may vary between wells, especially those of a different types, and may be different to any frequency band used for determining the first fluid flow velocity profile.

In some examples, the flow signal may be directly indicative of fluid inflow. For example, a relatively 'loud' acoustic signal may be indicative of more inflow than a relatively 'quiet' acoustic signal. For example, sensors (such as the fibre optic sensors mentioned above) may be used to provide a flow signal within an appropriate (for example, a determined) frequency band near each perforation of interest (for example, temperature excursions, or acoustic signal energy level), and this can be used to provide a first indication of the inflow at each perforation. This may be based on the principle (which will be familiar to the skilled person) that the amount of fluid entering the well is proportional to the energy of a signal in a particular frequency range raised to the power of n (where the value of n depends on the well type).

In a particular example, a flow signal may be indicative of temperature excursions, i.e. the frequency band is a frequency band which is associated with thermal signals (which may be a relatively low frequency band compared to some acoustic signals) caused by slugs moving past a perforation, as is discussed in greater detail below.

Such a flow signal allows an estimate of inflow from individual perforations to be determined, but the accuracy of the estimate may be affected by factors such as flow regimes, and may not provide reliable results where perforations are widely spaced.

From the inflow estimate, a fluid flow velocity profile may be determined (recalling that, as described above, the velocity of fluid in the well is related to the amount of fluid in the well).

In some examples, in particular where the hydrocarbon comprises at least some gas (and in some examples, the well is at least primarily a gas well) determining the second fluid flow velocity profile comprises:
  monitoring the temperature at a plurality of locations within the section of the well, the locations comprising
    (a) a first set of locations, at or near a perforation; and
    (b) a second set of locations at which the temperature is substantially independent of temperature effects of the inflow of gas at a perforation;
  determining an indication of temperature excursions at the locations;
  obtaining an indication of the inflow of fluids to the well by relating the indications of temperature excursions from the second set of locations to liquid inflow and relating the indications of temperature excursions from the first set of locations to liquid and gas inflow.

By monitoring the temperature at a perforation, the effect of gas inflow at the perforation on temperature through the Joule-Thompson cooling effect and the liquid (typically largely water) in a gas well can be obtained. By monitoring the temperature away from the perforations (for example at points between the perforations referred to herein as nulls), the temperature changes due to liquid flow can be considered, to a good approximation, independently from that of gas inflow. This allows an estimate of both liquid and gas inflow to be made, which can be used to determine the second fluid flow velocity profile.

If at least one of the second set of locations is above all well perforations, an estimate of the temperature excursion due to the total volume of water produced by the well in a time period can be determined. Further, it may be advantageous to obtain a measurement of the total volume of gas produced by the well section. Such measurements may be advantageous in scaling results to further estimate the volume of fluid/gas inflow at each perforation by reference to the total volumes of fluid/gas. In some examples, the first set of locations comprises locations at each perforation of the well section, and/or the second set of locations lie to each side of a location from the first set. This allows the contribution from each perforation to be considered, which may be of interest in well management.

In some embodiments, the method comprises determining an indication of inflow of water and/or gas from at least one perforation. This may allow a well operator to consider the implications of closing or sealing a particular perforation, and/or to attribute earnings amongst parties having an interest in the well.

Monitoring the temperature may comprise monitoring temperature changes without monitoring the actual temperature. In some embodiments, the temperature excursions are monitored over a period of time, and an indication of temperature excursions is determined by summing temperature fluctuations, averaging temperature fluctuations, and/or integrating signal energy arising from temperature fluctuations detected over the period. One such method comprises summing the 'energy' in the signals. As the skilled person is aware, at any given depth, the well will have a background, or equilibrium, temperature which is dictated by the geothermal energy of the ground in which a well is formed. Typically, wells are hotter at the bottom than the top and fluid or gas entering and/or moving through the well results in temperature displacements from this equilibrium temperature. The energy causing these fluctuations is indicative of the fluid flows.

Advantageously, the step of temperature monitoring and/or detecting a flow signal may be carried out by monitoring backscatter in an optical fibre suitable for use with Distributed Acoustic Sensing (DAS) sensing techniques. Such a system is capable of monitoring relatively small and/or rapid acoustic and temperature changes.

According to a second aspect of the invention, there is provided apparatus for monitoring fluid flow in a section of a well having multiple perforations through which fluids enter the well, comprising:
    an optical fibre, arranged along the length of the well section;
    an interrogator unit arranged to interrogate the fibre with optical radiation and to detect any radiation backscattered within the optical fibre;
    processing apparatus arranged to process the detected signals to:
        determine a flow signal associated with at least one slug moving through the well, and to determine a first fluid flow velocity profile therefrom, and
        determine a flow signal associated with fluid inflow at each of a plurality of perforations in the well, and to determine a second fluid velocity profile therefrom.
        determine a combined velocity profile by combining the first and second fluid velocity profile.

The processing apparatus may further be arranged to determine, from the combined velocity profile, an indication of fluid inflow at at least one perforation. The apparatus may be arranged to carry any part of the method of the first aspect of the invention According to another aspect of the invention, there is provided processing apparatus for determining an indication of fluid flow in a well, the apparatus being arranged to determine a first fluid flow velocity profile based on the velocity of at least one slug in the well; determine a second fluid flow velocity profile from an estimate of fluid inflow at each of a plurality of perforations in a well; combine the first and second fluid flow velocity profiles to provide a combined velocity profile.

The processing apparatus may comprise a processing apparatus of the apparatus for monitoring fluid flow of the second aspect of the invention, and may have any or any combination of the features described herein in relation thereto, including those set out in the claims. The processing apparatus may be arranged to carry out any of the method steps of the first aspect of the invention.

Features described in relation to any aspect of the invention may be combined with those of any other aspect of the invention.

DESCRIPTION OF THE DRAWINGS

Embodiments of the invention are now described by way of example only with reference to the accompanying figures, in which.

DESCRIPTION OF THE INVENTION

Figure 1:
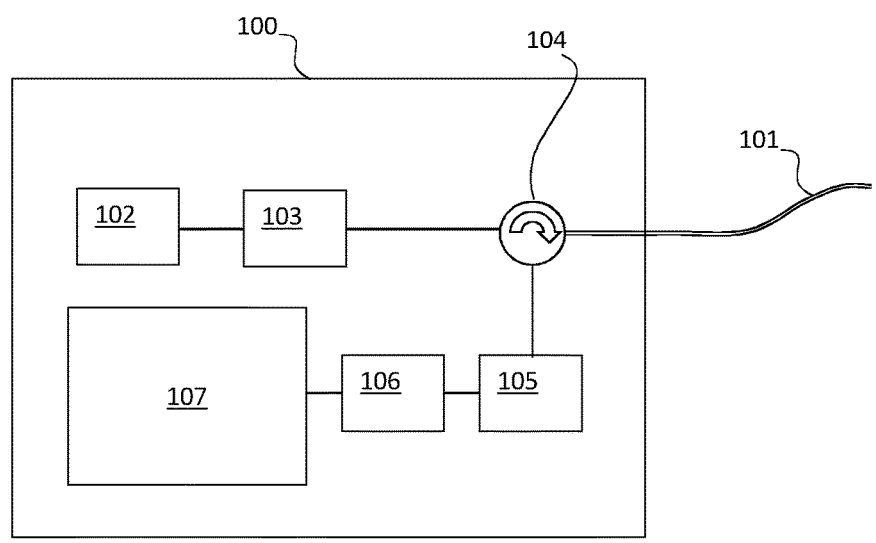
FIG. 1 shows a distributed fibre optic sensing apparatus.

FIG. 1 shows a schematic representation of a distributed fibre optic sensing arrangement. A length of sensing fibre 101 is removably connected at one end to an interrogator unit 100. The sensing fibre 101 is coupled to an output/input of the interrogator unit 100 using conventional fibre optic coupling means. The interrogator unit 100 is arranged to launch pulses of coherent optical radiation into the sensing fibre 101 and to detect any radiation from said pulses which is backscattered within the optical fibre 101. For a Rayleigh scattering based fibre optic distributed sensing apparatus, the interrogator unit 100 will detect radiation which has been Rayleigh backscattered from within the fibre 101. To generate the optical pulses, the interrogator unit 100 comprises at least one laser 102. The output of the laser 102 is received by an optical modulator 103 which generates the pulse configuration as will be described later. The pulses output from the optical modulator 103 are then transmitted into the sensing fibre 101, for instance via a circulator 104. An alternative to using an optical modulator would be to drive the laser in such a way that it produces a pulsed output.

Note that as used herein the term "optical" is not restricted to the visible spectrum and optical radiation includes infrared radiation, ultraviolet radiation and other regions of the electromagnetic spectrum.

A proportion of the light in the fibre 101 is backscattered from scattering sites within the fibre 101. In a simple model, the number of scattering sites can be thought to determine the amount of scattering that could occur and the distribution of such scattering sites determines the interference. A stimulus may result in a change of optical path length within the relevant section of fibre (which could be a physical change in length and/or a change in the effective refractive index in part of the fibre). In this simple model, this can be thought of as changing the separation of the scattering sites but without any significant effect on the number. The result is a change in interference characteristics. In effect, the stimulus leading to optical path length changes in the relevant section of fibre can be seen as varying the bias point of a virtual interferometer defined by the various scattering sites within that section of fibre 101.

Any optical radiation which is backscattered from the optical pulses propagating within the sensing fibre 101 is directed to at least one photodetector 105, again for instance via the circulator 104. The detector output is sampled by an analogue to digital converter (ADC) 106 and the samples from the ADC 106 are passed to processing circuitry 107 for processing. The processing circuitry 107 processes the detector samples to determine an output value for each of a plurality of analysis bins, each analysis bin or channel corresponding to a different (albeit possibly overlapping) longitudinal sensing portion of interest of optical fibre 101. It will be noted that the interrogator unit 100 may comprise various other components such as amplifiers, attenuators, additional filters, noise compensators, etc. but such components have been omitted in FIG. 1 for clarity in explaining the general function of the interrogator unit 100.

Figure 2:
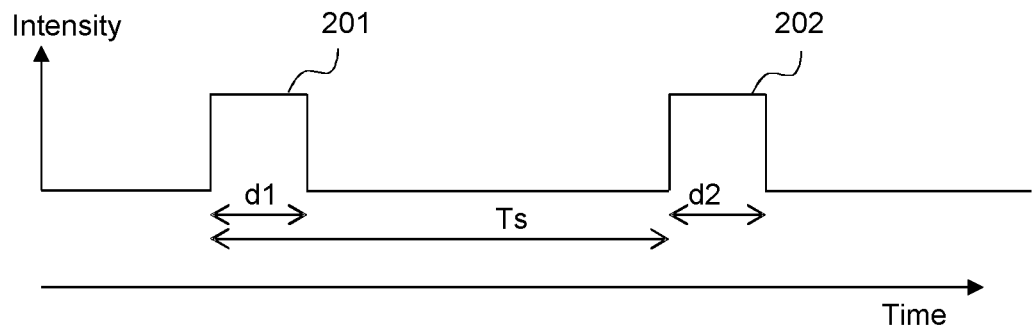
FIG. 2 shows pulses which may be used in distributed fibre optic sensing.

In embodiments of the present invention, the laser 102 and modulator 103 are configured to produce at least one series of pulse pairs at a particular launch rate as now discussed in relation to FIG. 2. However, other pulse configurations are possible.

FIG. 2 shows a first pulse 201 at a first frequency F1 and having a duration dl followed a short time later by a second pulse 202 having a second frequency F2 and having a second duration d2. The frequencies of the two pulses F1, F2 may be the same, or may differ. In some examples, the durations (and hence the spatial widths) of the two pulses d1, d2 are equal to one another although this need not be the case. The two pulses 201, 202 have a separation in time equal to Ts (as shown Ts represents the time separation between the leading edges of the pulses).

When a pulse pair propagates within the optical fibre 101, some light will be scattered from each of the pulses 201, 202 from the intrinsic scattering sites within the optical fibre 101. At least some of this backscattered light will be guided back to the beginning of the optical fibre 101 where it can be detected. The backscatter signal received at the detector 105 at any instant is an interference signal resulting from the combination of the scattered light.

The distributed fibre optic sensor of FIG. 1 relies on the fact that any disturbance to the optical fibre e.g. strain, or thermal expansion or changes in refractive index due to temperature changes in the optical fibre 101 will cause an optical path length change which can therefore phase modulate the interference signal generated. Detecting a phase change in the interference signal from a particular section of fibre 101 can thus be used as an indication of an optical path length change upon the optical fibre 101 and hence as an indication of conditions (temperature, strain, acoustic etc) at that section of fibre 101. Such phase based sensors have the advantage of providing a linear and quantitative response to an incident stimulus. In principle, a series of single pulses could be used but in that case there would not be a quantitative relation between the output signal and the stimulus.

In this example, the interrogator unit 100 is operated substantially as is described in greater detail in our previously filed applications WO2012/134022 and WO2012/134021, which are incorporated herein by reference to the full extent allowable. In one example, channels are defined by a certain sampling time after launch of a pulse pair, and the successive detector outputs provide a phase modulated carrier signal at a frequency defined by the frequency difference between the pulses of a pulse pair (and therefore comprising an interference signal between light backscattered from both pulses of a pair), which may be obtained, for example, by using the modulator 103 to modulate the frequency between launching the pulses within a pulse pair.

As also described in our previously filed applications WO2012/134022 and WO2012/134021, there may be a relative phase difference between the pulses of a pair, and this relative phase difference may change from one pulse pair to the next. In one arrangement, which offers processing advantages, the carrier frequency is arranged to be one quarter of the launch rate such that a signal at the carrier frequency evolves by 90° in phase between launch of successive pulse pairs. This also allows for efficient use of modulation bandwidth.

Figure 3:
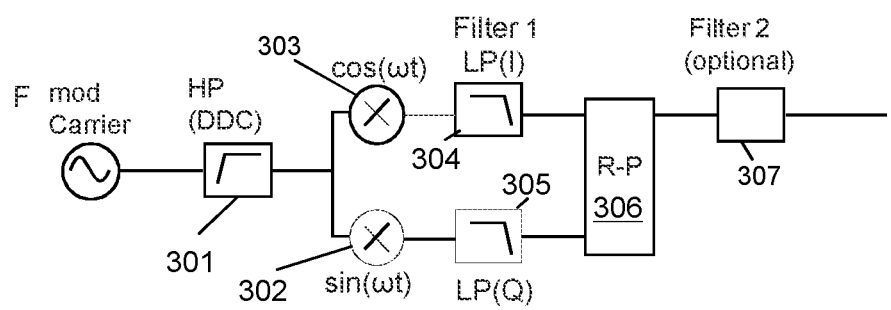
FIG. 3 shows detail of the processing circuitry of the apparatus of FIG. 1.

FIG. 3 illustrates one embodiment of how this modulated carrier signal is processed by processing circuitry 107 to determine the phase of the carrier signal for a single channel. The samples representing the modulated carrier signal for one channel of the sensor are high pass filtered 301 to remove any components at DC or low frequency. The filtered signal is divided into two processing channels and the signals in each channel are multiplied by either sine 302 or cosine 303 functions at the carrier frequency and then low pass filtered by I and Q component low pass filters 304 and 305 to generate In-phase (I) and quadrature (Q) components as is known in complex demodulation schemes. Where the carrier frequency is ¼ of the ping rate, each sample is multiplied by either 0, +1 or −1. The resultant I and Q signals are then used to calculate the phase value by rectangular to polar (RP) conversion 306.

RP conversion may optionally also generate an amplitude value. The output signal is a phase shift measured in radians over the frequency range from 0 Hz to an upper limit that is determined by I and Q component low pass filters 304 and 305.

In conventional DAS techniques (i.e. those applied to detecting acoustic signals), this phase shift, $\Phi_0$, may be high pass filtered. This is considered advantageous as it eliminates unwanted noise signals that lie in the low frequency region. However, in the embodiment described below, it is low frequency temperature changes which are of interest and therefore the phase value may be (optionally) low pass filtered to remove acoustic effects and to that end (in a departure from the teaching of WO2012/134022 and WO2012/134021), the data is passed to a low pass filter 307. In practice, even if the low frequency signal is of interest, the high frequency signal portion could be retained and processed separately for acoustic sensing (possibly having be subject to other bandpass filtering to isolate a frequency band of interest), thus providing a combined DAS and temperature (and/or other slow acting changes) sensor. For the sake of isolating a signal relating to temperature fluctuations, the cut off frequency of the low pass filter 307 is preferably predetermined but it will be appreciated by the skilled person that there is no well defined distinction between acoustic signals and temperature signals. However typically the boundary between them is taken to be somewhere between 0.1 and 1 Hz, although other ranges including for example 1-10 Hz (which could be considered to overlap with the acoustic range) may also be considered. This filtering is further described below. However, as also noted in greater detail below, it may not be required in all examples, and in some example, a different frequency band may be of interest, in which case the filter 307 may comprise one or more bandpass filters.

In some embodiments, the threshold of the I and Q component low pass filters 304 and 305 may be selected to isolate, or substantially isolate, the low frequency components of the phase signal, and the subsequent phase value low pass filter 307 may not be required. As the skilled person will appreciate, such filters may be primarily provided to remove the 'double-frequency' components generated in the mixing stage of producing the I and Q components, however they could also be used to remove any component at the carrier frequency which results from any remaining low frequency input signal being multiplied by the sin and cos terms. To that end, the threshold is generally set to be less than the carrier frequency. For example, the low pass filters may be set to have a cut-off at $\frac{1}{3}^{rd}$ of the carrier signal frequency, which will preserve all signals imposing path length changes in the optical fibre at that frequency and below. However, in examples in which the low frequency signals are of interest, the low pass filters 304 and 305 could instead have a much lower cut off, of for example 100 Hz or lower. This also assists in improving the stability of the demodulation as now explained.

The stability of the demodulation process depends on sufficient light having been backscattered from the two pulses to generate a carrier with sufficient carrier to noise ratio (CNR). These scattering sites are effectively distributed randomly within the fibre 101. For some sections of the fibre 101, light backscattered will tend to interfere constructively giving a large backscatter level from a pulse while for other sections there will be more destructive interference resulting in a lower backscatter level. If the backscattered light from either of the two pulses falls then the carrier level generated by mixing them together will decrease. A lower carrier level will mean that the I,Q components become noisier and if the noise level becomes too large then phase obtained from them will show a series of $2\pi$ radian jumps thereby corrupting the data. The probability of these $2\pi$ jumps occurring is inversely related to the total noise level on the I and Q components. As this noise is broadband, its level can be reduced by using a lower frequency cut for filters 304 and 305 in FIG. 3. Therefore reducing this bandwidth reduces the chances of generating a $2\pi$ jump in the data and so the stability of the demodulation process is improved.

The task of isolating the low frequency signal can therefore be carried out by the I and Q component low pass filters 304, 305 or by the phase value low pass filter 307, or be shared between them. However, lowering the cut off threshold of the phase value filter 307 does not improve the stability of the demodulation.

It will also be appreciated that the threshold selected for filtering depends on the signal of interest. Generally, the filter(s) should be designed to retain all of the signal of interest. Considering the example of temperature, therefore, when designing the system, the anticipated temperature variation, and the speed with which the fibre reacts, should be considered, and an upper frequency threshold which preserves the fastest changing value of the anticipated changes.

However, it has been noted that, in some downwell environments (for example, in tight gas wells), temperature signals dominate over acoustic signals. It may therefore be the case that no filtering is required at filter 307 (i.e. the filter 307 may be absent) to isolate the low frequency temperature signal as it may be the dominant signal.

Assuming that the phase change (or the retained low frequency phase change) is largely due to temperature change, the temperature change may be determined from the suitably processed data by multiplying it by a predetermined temperature/phase relationship of the fibre cable. The temperature/phase relationship will depend on the fibre used. In general, the temperature/phase relationship for a bare fibre is well known but this is modified if extra coatings are placed on it or if it is included in a cable structure. The temperature/phase relationship for a particular cable could be calculated or experimentally measured. If the primary aim of a particular distributed sensing system based on Rayleigh backscatter in an optical fibre is to measure temperatures, a fibre with a high change in phase with temperature may be used. This could for example be obtained by using a fibre with a coating of a material (which may be a relatively thick coating to enhance the effect) with a high thermal expansion coefficient.

For a dual pulse system, the conversion of phase to temperature can be done for any amplitude of signal. For single pulse systems this is not possible due to the well-known signal fading issue. However for large slow temperature variations that cause wrapping of the signal, is it possible to estimate the rate of phase and hence temperature change in a single pulse system.

While knowledge of the actual temperature variations may be useful because it enables signals from different locations to be compared which may in turn help develop a better understanding of how various processes cause temperature variations around the sensing fibre 101, in the embodiments described herein below such a measurement is not essential as it is relative temperature changes which are of interest.

Steps may also be taken to compensate for laser phase noise and the like. In particular, laser phase noise is due to a slow drift in the wavelength of the laser generating the interrogating radiation. This can impose a similar phase shift as a slow acting stimulus and may therefore be difficult to distinguish from a temperature change. In a conventional DAS system to detect acoustic signals, laser phase noise is less of a concern, as it is seen away from the signal band of interest. However, laser phase noise may in some embodiments be a significant component of the phase change signal at low frequencies (say, under 1 Hz).

However, phase noise produces a signal that is the same throughout the fibre. Therefore, in one example, a portion of the fibre which is at least substantially shielded from at least some other slow acting changes (e.g. is in a temperature stable environment, to shield from temperature changes), and to use the backscatter signal from this shielded section of fibre to provide an indication of laser phase noise. In another example, laser phase noise may be estimated by calculating the mean signal returned from at least some, and possibly each, portion of the fibre (i.e. each channel). In some examples, the signal from some (preferably most) portions of the fibre could be used to determine the mean, but signals returned from those portions which have high levels of low frequency signal from other sources such as the signal of interest or high levels of noise due to a low carrier signal could be excluded. Although this offers the advantage that no shielded section of fibre is required, it assumes that the low frequency signal of interest in the portions of fibre used to calculate the mean are uncorrelated (as, for example, if the whole fibre was subjected to the same temperature change, this temperature signal would also be consistent across all channels, and difficult to distinguish from noise). However, in the application of temperature sensing in a well, such a change would usually be very slow and very low frequency changes can be filtered out with a high pass filter as outlined below.

Once an estimate of laser phase noise has been determined, it could be compensated for in the signals.

In addition, steps may be taken to ensure that 'good quality' data is obtained and utilised in deriving measurement signals. For example, as described in WO2012/137021, a plurality of samples corresponding to each sensing portion of interest may be acquired (these samples may be acquired from overlapping sections of fibre) and designated as separate channels for processing. The channels may be combined according to a quality metric, which may be a measure of the degree of similarity of the processed data from the channels. This allows for samples which have a high noise level, for example due to fading of the carrier signal, to be disregarded, or given a low rating in the final result.

However, the method described in WO2012/137021 utilises a high pass filter, which may also remove thermal information. Therefore, if it is low frequency signals which are of interest, to ensure that this information is returned but that the benefits of the method described in WO2012/137021 are maintained in the context of low frequency phase modulation, the method may be implemented without high pass filtering. Instead of choosing the channels which are most similar, the quality metric may instead be based on a determination of the level of signal at high frequency (with lower levels being favoured), or the ratio between the signal at low frequency (e.g. 2-20 Hz), the signal at high frequency (with higher ratios being favoured), or the maximum differential of the signal with respect to time. These methods are not affected by the level of the DC offset and are based on the fact that most signals due to physical disturbances have a higher level at low frequencies, while the system noise, which depends on the variable carrier level, has a flatter spectrum.

Without additional processing when there is a change in the selection of channels for combination, there is also likely to be a step in the output signal as the new set of channels would generally have a different mean offset to the old set.

Therefore a DC offset may be added to the mean of the selected channels to give the output signal. When the set channels changes, in order to avoid or smooth a step change in the output, the difference between the mean of the new set and the old set may be considered and the DC offset may be set to remove any step change. In particular, the mean of several successive samples of channels may be considered and the DC offset change may be smoothed over a number of such sample sets so that there is no step in the data, effectively tapering the data from old to the new set of channels to produce a smoother join.

A quality metric may be determined on a rolling basis or periodically. In any event, the number of samples in the join region should be lower than any block length so as to ensure that the block length is such that multiple changes during the join region can be avoided. This can be controlled either by setting a minimum block length, or setting the number of samples which contribute to a join, or both, and could be predetermined or vary according to the data collected.

As will be appreciated, such a quality metric is used to ensure to ensure that 'good quality' data is emphasised in the processed data. However, in other examples, after 'bad data' has been identified, it could simply be replaced with 'good data' from surrounding channels.

For example, as noted above, demodulation failure may be identified by looking for steps of multiples of $2\pi$ between samples. In practice, this may occur over several samples, such that the full $2\pi$ change may be made over 5, 10 or more samples from different pulse pairs. Therefore, the threshold for detecting a change might be set below $2\pi$, for example 60% of a $2\pi$ change, measured across the difference of, for example, five samples from different pulse pairs, although other thresholds and sample spacing may be appropriate depending on the data set and sample rate.

Samples may be considered from within a time frame of, for example, a second (although other periods may be appropriate for a given sample set). If the characteristic of demodulation failure is detected, this data may simply be replaced one or more neighbouring channels which do not exhibit the characteristic. In one example, if both adjacent channels have not exhibited the characteristic, then the average of these channels may be used. If no adjacent channels are 'good', then data from the closest good channel may used. As mentioned above, it may be desirable to adjust or taper the join between data sets.

Following 'repair' in this way, the data may be downsampled, (for example decimated by 100). Such downsampling may be carried out using one or more of Finite Impulse Response (FIR) filter, through use of a signal processing tool such as the decimation tool in MATLAB or the like. Additional filtering and/or normalisation may be carried out.

Following such decimation, trends in the data will be apparent. It will be noted that this technique relies on the fact that relatively few channels will suffer from demodulation failure, but this is consistent with observed results. It has also been observed that channels suffering from demodulation failure may remain in that state for some time, for example hours.

In some circumstances, such a method will preserve more original data than methods using, for example, weighted averages with reference to a quality metric.

Other methods may be used to assist in identifying data which is likely to suffer from demodulation failure. For example, channels that have a low carrier to noise ratio (CNR), which is typically observed prior to, and after periods of demodulation failure. Therefore, CNR could be used to indicate an anticipated state of demodulation failure and/or data exhibiting low CNR could be replaced as outlined in relation to demodulation failure above.

As use of such a sensing optical fibre 101 is relatively inexpensive, it may be deployed in a wellbore in a permanent fashion as the costs of leaving the fibre 101 in situ are not significant. The fibre 101 is therefore conveniently deployed in a manner which does not interfere with the normal operation of the well. In some embodiments a suitable fibre may be installed during the stage of well construction.

Figure 4:
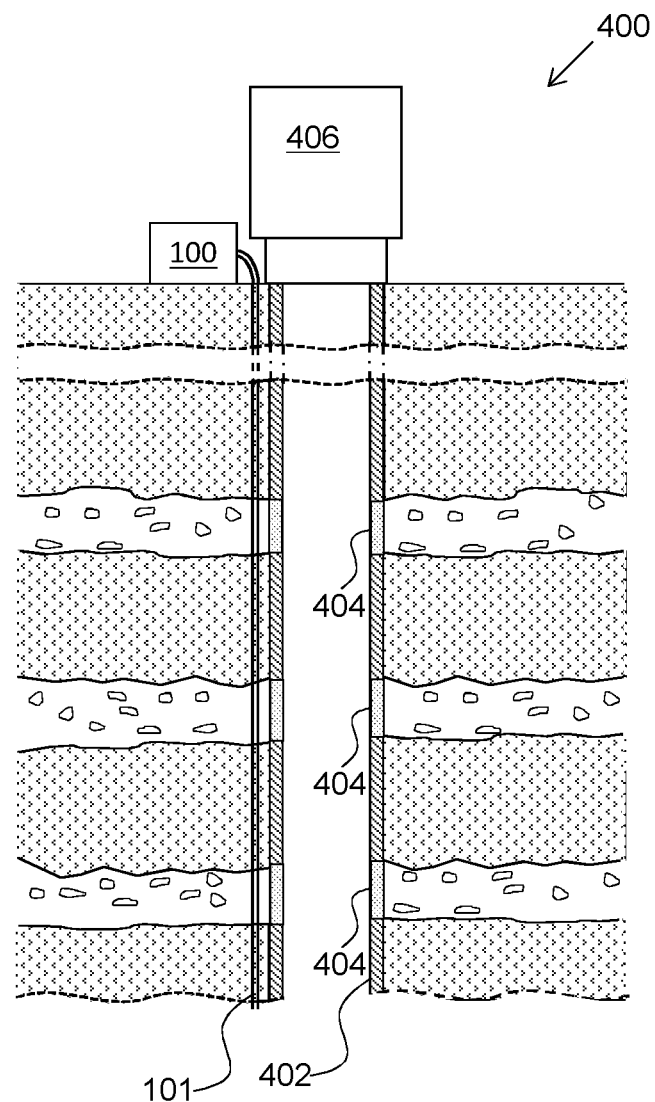
FIG. 4 shows a well incorporating fibre optic sensing apparatus.

FIG. 4 schematically shows a well 400 for accessing underground hydrocarbons, having distributed fibre sensing apparatus associated therewith.

The well 400 comprises a well shaft 402, which has a number of perforations 404. The perforations 404 are in the region of gas or other hydrocarbon reserves, and allow fluids to enter the shaft 402, where they rise, either under their own pressure or raised using pumps and the like, to a well head 406 where the hydrocarbon is collected and contained.

However, as will be familiar to the skilled person, in practice, a mixture of hydrocarbon and water will almost always be seen entering the shaft 402 via the perforations 404. When the proportion of water reaches a certain point, the well 400 will become economically unviable. Also, in some instances, a large proportion of water can reduce or even stop the flow of hydrocarbon from a well. However, if the perforations 404 which are introducing a disproportionate amount of water could be identified and, for example, sealed, this could increase the economic life of the well 400 and the efficiency of extraction.

It is also helpful to track how much hydrocarbon each perforation 404 is contributing to well production.

The well 400 comprises a sensing fibre 101, which is attached to an interrogator unit 100 as described in relation to FIG. 1 above, and, in this example, operated as described in relation to FIGS. 1 to 4.

In use of the well, the fibre 101 is interrogated with radiation to provide acoustic and/or temperature sensing. This returns a flow signal, which may be indicative of a temperature change or of an acoustic signal at a given depth of the shaft 402, and is specifically related to the temperature/acoustic changes in the well 400 at that depth. In the examples described below, it is the relatively low frequency temperature changes which are monitored. However, in other examples, other frequency bands may be monitored.

As will be familiar to the skilled person, in extraction of a hydrocarbon reserve, water is usually extracted along with the hydrocarbon. The liquids can form what are known as 'slugs' in the well and, in the example of a gas well below, that term shall be taken to mean a substance which is capable of significant heat transfer or generation of acoustic signals within a well bore relative to other substances (e.g. gas) within the well. Note, in this case, 'significant' can mean capable of a temperature change on the order of milliKelvin, which is nevertheless capable of being readily detected by the interrogator unit 100. As liquid generally has a higher specific heat capacity and thermal transfer coefficient than gas, for a given temperature difference, a given volume of liquid in a well may have a greater cooling/heating effect than the same volume of gas. The slugs may be substantially water, oil or a mixture thereof (although it will be appreciated that the slugs will likely contain other substances, in particular mud, sand, contaminants, and the like), or may be a portion of gas with a high proportion of water.

There is usually a thermal gradient up a well due to geothermal gradient in the surrounding ground, with the lower sections of the well being generally hotter than the upper sections. A slug moving up the well is therefore generally warmer than its surroundings, and, as is described in greater detail in relation to FIG. 9 below, the temperature disturbance created by a slug can be tracked through a series of time-lapse temperature profiles of at least a portion of a well to provide a slug velocity profile over the well. In one model of a well, the slug velocity may be considered to be indicative of fluid velocity, and therefore determining the slug velocity profile allows a first fluid velocity profile to be determined.

In addition, as the fluid velocity at a point is related to the amount of fluids in a well, if the inflow from perforations was estimated, this could allow a second fluid flow velocity profile to be determined.

In some examples, an estimate of fluid inflow may be determined by assuming that the energy level of the signal due to inflow observed at any perforation is related to the amount of inflow. In some examples, the amount of fluid entering the well is estimated to be proportional to the energy of a signal in a particular frequency band raised to the power of n (where the value of n depends on the well type). However more complex models may be developed, and may better reflect actual inflow.

One example of estimating the fluid inflow at individual perforations is now described in relation to FIGS. 4 to 8. In the example now described, the well 400 is at least primarily a gas well and the method comprises monitoring the temperature variations due to slugs.

As skilled person will be aware that the expansion of gas as it passes through a perforation 404 and expands into a shaft 402 can cause local cooling due to the Joule Thompson effect. In addition, liquids from a reservoir injected at a perforation will be at around the equilibrium temperature of the reservoir, which may be different to that inside the well shaft. Further, slugs moving though the well 400 may have originated from a section of the reservoir that is higher or lower than the perforation in which case they may be at a different temperature to the perforation.

By monitoring for changes in temperature at a perforation, one can detect temperature changes which are indicative of inflow. By virtue of the thermal gradient of a well, a slug is likely to heat the area surrounding the perforation, which is otherwise cooled by the expanding gas. However, this need not always be the case: it is possible that the slug may be cooler than the area surrounding a perforation. In any event, as there are different mechanisms affecting the slug temperature and the temperature surrounding the perforation, they are unlikely to be in thermal equilibrium. Further, the amount of cooling by one particular slug will depend on the volume of that slug and its speed (a slower moving slug has more time to affect heat transfer).

Figure 5:
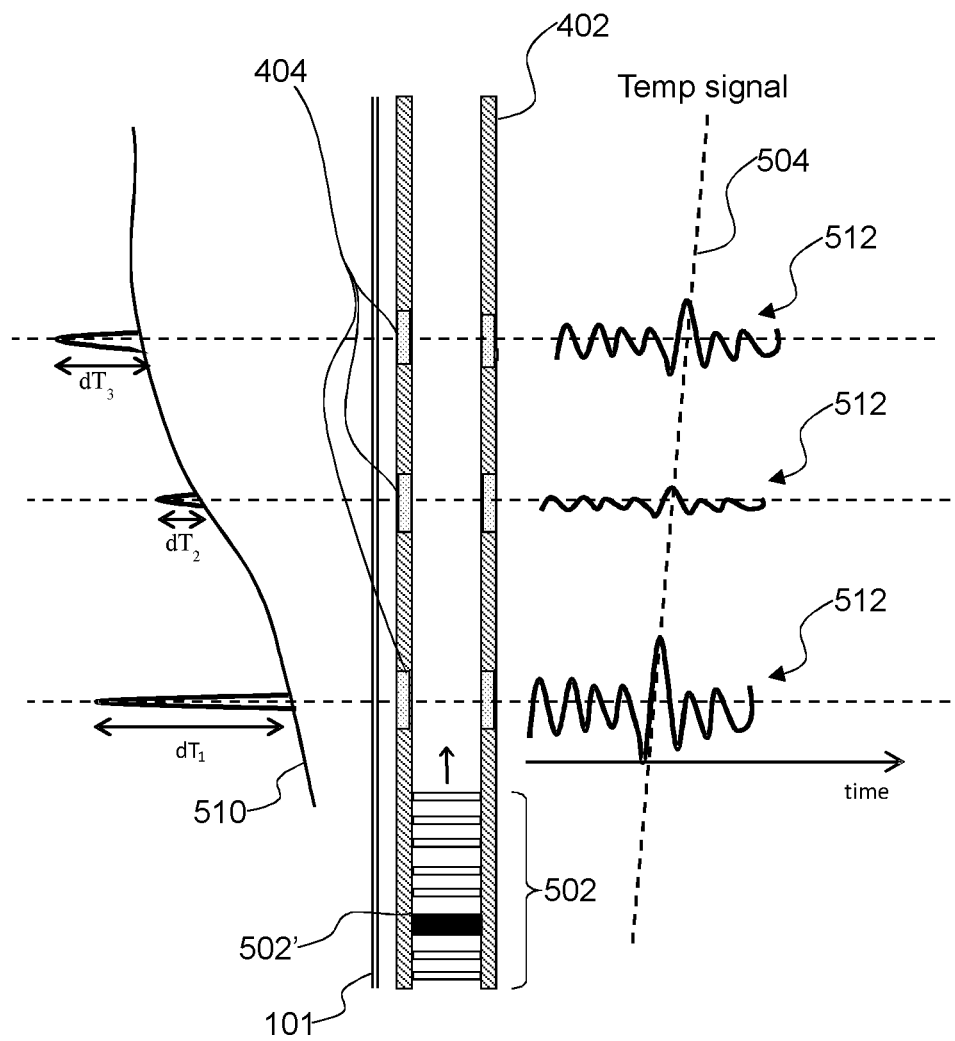
FIGS. 5-10 shows signals associated with locations in a well.

By consideration of these factors, a model of a gas well, as is shown in FIG. 5, in which a group of slugs 502 progress up a well shaft, may be developed. As a slug 502 passes a perforation 404, there is a temperature change, which is detected by the interrogator unit 100. In general, the temperature at the fibre 101 portion adjacent to the perforation will usually increase then decrease as the slug travels to and past the perforation region. The sequence of slugs 502 create oscillatory temperature changes 512. As shown in FIG. 5, the path of a given slug (which for the purpose of example is a large slug 502') can be tracked past each perforation 404, in this case (as it is relatively large) as a larger temperature change. The time offset between detections (i.e. the gradient of 504) is an indication of the speed of the slug (and could therefore be used to generate a fluid flow velocity profile based on slug tracking).

FIG. 5 shows a thermal gradient 510 of the well 400 (which may have been determined for other purposes). At each perforation 404, the Joule Thompson cooling causes the local temperature to dip below that of the background thermal gradient. The amplitude of each temperature dip, as shown relative to the thermal gradient 510 as $dT_{1-3}$, is related to amount of gas inflow at each perforation 404, with higher inflow generally resulting in a larger temperature dip. As the skilled person will appreciate, the temperature gradient 510 and the dips $dT_{1-3}$ are not to scale and amplitude of the dips has been exaggerated on this figure for clarity. In some cases, especially for perforations with low inflow, they may be difficult to distinguish from other localised variations in the thermal gradient 510.

For the purpose of discussion, while it might therefore be considered that the middle perforation 404 (which is associated with a relatively small dip $dT_2$) is producing less gas than the lowest perforation 404 (which is associated with a relatively large dip $dT_1$), in practice, care should of course be taken when making such assumptions: the skilled person will be aware that there are other processes which could affect the temperature change, and that the Joule Thompson effect is dependent on, amongst other factors, pressure, which varies with well depth. However such factors may be taken into account for a given well.

Although in this example, DAS (i.e. Rayleigh backscattering based) sensing principles are used (and are sensitive enough to detect these temperature changes), alternative temperature sensing techniques could be used.

While for the purpose of illustration, the slugs 502 are shown as regular formations, each spanning the whole cross section of the well, the skilled person will be aware that this may not be the case. Slugs may occupy only part of the cross section, in some examples having an annular form (which may or may not be a complete annulus) in contact with the walls of the well 400.

The thermal gradient 510 provides an 'equilibrium' temperature for each point in the well, i.e. the temperature that the well would have absent of any fluid flow. As will be appreciated by the skilled person, the thermal gradient is used for many purposes in relation to a well, including as a baseline for temperature excursions, but also for geological surveys, determining the conductivity of substances such as brine at a given depth, etc. The thermal gradient may be measured (for example during production of the well, during shut-in periods, or through repeated logging runs) or may be estimated based on, for example, the known thermal gradient in the region, the composition of the ground surrounding the well, or the like.

The signal magnitude corresponds to the temperature change caused by the passing slugs 502 which in turn is related to the heat transfer and is due to a combination of factors. These factors include the cooling effect of gas inflow and therefore the volume of gas entering the well at a given perforation 404, as a larger cooling will result in a greater difference between the temperature of the slug and the perforation. It will also depend on the heat transfer capabilities of the slug which will be related to the amount of liquid in it. Thus signals at the lowest perforation 404 in the figure which has a larger degree of cooling (i.e. is associated with a relatively large dip $dT_1$) will be greater than those in the middle perforation 404 where the cooling is less (i.e. it is associated with a relatively small dip $dT_2$).

Figure 6:
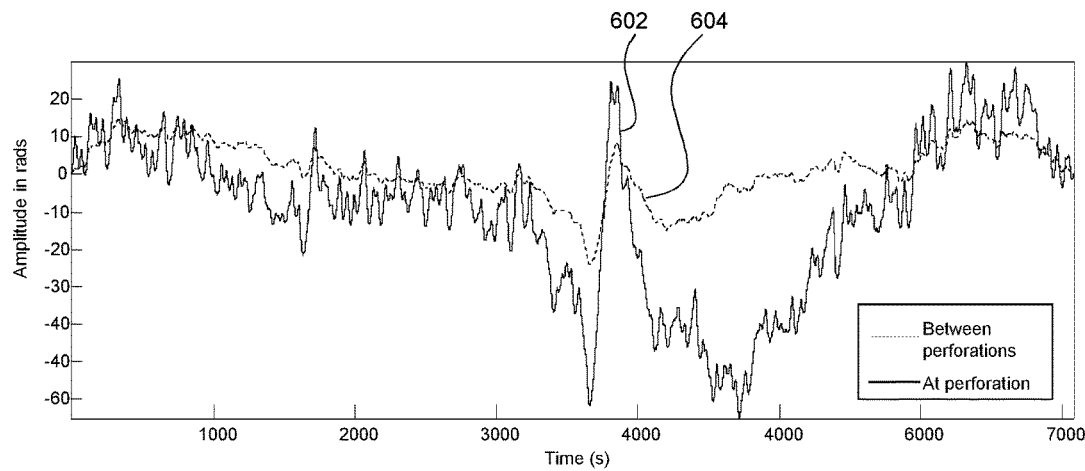

FIG. 6 shows the signals due to temperature changes gathered at a single perforation over time (solid line 602) along with the temperature signals gathered at a location which is between perforations (dotted line 604). It can be seen that the signal between perforations is less variable than the signal at the perforation.

Although the signal between the perforations is smaller, there is nevertheless an appreciable signal. This is due to the temperature difference between the well and the passing slugs 502. A slug 502 having moved up from further down the well will generally be warmer than the background thermal gradient 510 of the well. At a perforation 404 the temperature will generally be less than this background gradient 510 due to the effect of gas inflow so the temperature difference between the slug 502 and the well 400 will be greater than at locations between perforations 404 where the well temperature will be closer, or at the temperature associated with the background thermal gradient. Thus the signals from between perforations 404 will tend to be smaller than those obtained at perforations 404.

Over time (perhaps minutes or hours, which allows a reasonable picture to be obtained whilst still being able to assume that the well 400 will have maintained a roughly steady state, and ensuring that enough slugs 502 have passed to ensure both that a representative sample will have been obtained from each perforation, and that any variation in measurement due to noise, etc. will be smoothed) the temperature fluctuations can be used to give a measure of signal size (e.g. an indication of the sum of the temperature excursions) at various points over a well.

Figure 7:
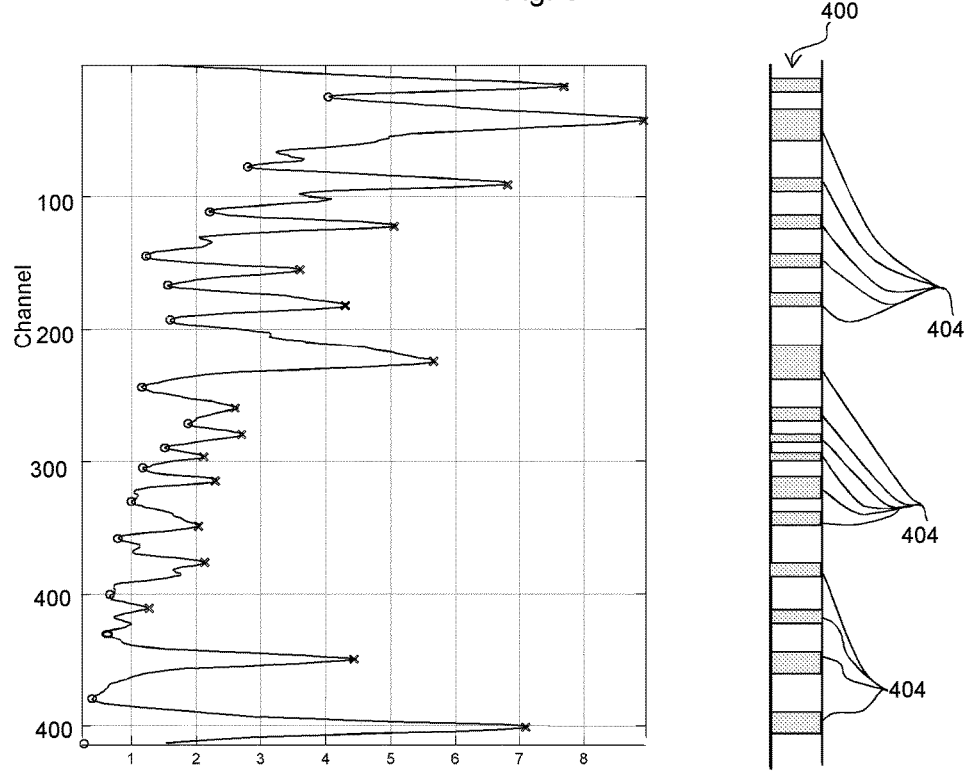

Example data is shown in FIG. 7, in which signals at perforations marked with an X can be compared the signal levels between perforations marked with a O. This gives rise to set of signals (the signals at each perf, $S_{perf\,n}$, and the signals between the perforations, $S_{null\,n}$). The peaks and troughs providing these signals can be identified at least in part from the known location of the perforations 404, or could be identified from analysis of the signals to identify the peaks or a combination of these techniques (and/or other techniques) could be used. Knowledge of other factors which may contribute to the signal allows them to be filtered out or ignored if possible.

The data shown in FIG. 7 is produced by integrating the signal energy in a frequency band that captures the temperature oscillations associated with the slug flow passage (although a different frequency band could be used in other examples). This could be achieved by summing a Fast Fourier Transform FFT in the frequency range or obtaining the RMS of the data after filtering to the desired frequency range. In this example, the signal level data was calculated by taking a RMS power level after high pass filtering at 0.003 Hz to remove any slow drifts in the DC level of the data (for example, the well may be gradually cooling or warming). Although in this example, the threshold was set to 0.003 Hz, the frequency threshold may be determined on the basis of an individual well in a given state by examining the data and estimating the frequency of the temperature oscillation caused by the slugs, which is related to slug velocity, and ensuring this information is maintained. Although the actual temperature signal may be seen at lower frequencies, there will be a significant signal at this frequency range, and it has been noted that this signal will also be amplified at the perforations. As noted above, although low pass filtering may be desirable in some embodiments to remove acoustic signals for example, this may not always be necessary.

The cause of these signals is the interaction of the slugs with the surroundings. The magnitude of temperature change will be related both to the temperature difference between the slugs and the surroundings at the point in the well and to the volume of water. Further, while more water may be added at each perforation 404, under normal conditions, little or no water will be lost. Therefore, the signal $S_{perf\,n}$ at a perforation n may have the terms $$S_{perf\,n} = k\left([dT_{perf\,n} + dT_{slug}] \times \sum_{1}^{n} W_{perf\,n}\right) \quad \text{(eqn. 1)}$$

where $dT_{perf\,n}$ is the departure from the temperature that might be expected in a steady state condition given the well's thermal gradient (which, as noted above, is related to the volume of gas introduced into the well at that perforation), $dT_{slug}$ is the difference between the temperature of the slug and the steady state well temperature and $W_{perf\,n}$ is the water from a given perforation (summed to give the total amount of water available for thermal conduction), and k is a constant.

The signal is also dependent on the velocity of the slug, but this is assumed to be constant over a portion of well under consideration (or the length of each section considered is limited to that over which the velocity can, to a good approximation, be considered as constant). Otherwise, the slug velocity could be included in the model.

Therefore, it can be appreciated that the term $[dT_{perf\,n}]$ is the 'change relative to background' shown in FIG. 5 as peaks $dT_{1-3}$.

This equation has several terms of interest: if the $dT_{perf\,n}$ term could be found, this could be used to give a measure of production of gas at perforation n, which would be of use to a well operator. Second, if the $W_{perf\,n}$ terms could be found, this might identify the perforations which are introducing excessive amounts of water into the well 400.

In a simple model, an estimate of fluid inflow may be made by assuming that:

$$S_{perf\,n} = kdT_{perf\,n}.$$

However, in this example, an attempt is made to solve equation 1. Nevertheless, equation 1 cannot be solved analytically, as it contains too many unknown variables. In particular, it will be appreciated that it is difficult to measure $dT_{slug}$ absolutely, as it is unlikely that the fibre 101 will come into thermal equilibrium with a slug 502 due to its finite transit time. However, considering the signal between the perforation provides additional information.

Specifically, the signal between the perforations (which is proportional to the temperature excursion) can be modelled as follows (where the terms are as defined above):

$$S_{null\ n} = k\left(dT_{slug} \times \sum_{1}^{n} W_{perf\ n}\right) \quad \text{(eqn. 2)}$$

This equation is also underdetermined, as k and $dT_{slug}$ are unknown. However, when coupled with equation 1 and with a sufficiently large number of perforations, the number of unknowns is only slighter more than the number of equations (when expanded), which allows a best fit numerical solution to be found, for example using a least squares algorithm. As n increases, and as long as the slug velocity is at least approximately constant or otherwise accounted for, the reliability of the best fit solution will increase.

It is also noted that, typically, the thermal gradient in a well means that a slug travels from a hotter region to a cooler region, and in doing so deposits heat. Therefore, it could also be considered that the term $kdT_{slug}$ will be related to the thermal gradient. Indeed, it may be, to a reasonable approximation, proportional to the thermal gradient. Whilst this is not essential, in some examples the thermal gradient will be known (or can be readily determined by the skilled person using known techniques). This could be carried out at just some of the nulls, and could be used to inform the best-fit process. Indeed, it may be possible to solve this for all nulls, which could allow an absolute solution (i.e. analytical rather than numerical) to the inflow.

The best fit solution could be constrained according to other known (or estimated) features of the gas well. In particular, it could be assumed that none of the water or gas terms will be negative, as in practice little to no water or gas should escape the well bore, so one constraint might be that no such terms are negative. In addition, it may be possible to obtain some absolute temperature information. As, while noted above, it may be difficult to measure the absolute temperature difference $dT_{slug}$ due to the finite transit time, it may be possible to obtain measurements of some of other temperatures or temperature changes, for example using techniques such as Distributed Temperature Sensing (DTS) or providing other temperature sensors in the well. It may be that, in practical terms, such sensors could be used to determine or estimate some of the larger temperature changes or it may be able to give an indication of $dT_{perf}$ in some locations.

As the skilled person will be aware, there can be significant water at the bottom of a well, indeed there may be a portion of standing water. Therefore, the method is preferably employed over a section of the well which is sufficiently far from the bottom of the well to avoid risk that the data could be influenced by standing water.

The best fit solution is sensitive to the initial amount of water. In particular, if the lowermost perforation injects a large amount of water, it may be that subsequent water terms may not be readily distinguishable. Therefore, a supplementary technique, such as a known flow monitoring technique could be used in particular to inform the model at the base of the well (although they could also be used throughout the well).

Alternatively or additionally, it may be preferred to start the method as far down the well as possible, before significant water inflow. More generally, the amount of water at the base of the well may be considered when assessing the confidence in the model. For example, a well which appears to be producing more water from higher than from lower perforations may be considered with a higher degree of confidence as to its accuracy than if the reverse is true.

Looking again at FIG. 7, the generally increasing nature of signal at the nulls is due to water inflow. The peak height above this trend is related to a temperature change due to gas inflow, but scaled by the water terms.

Figure 8:
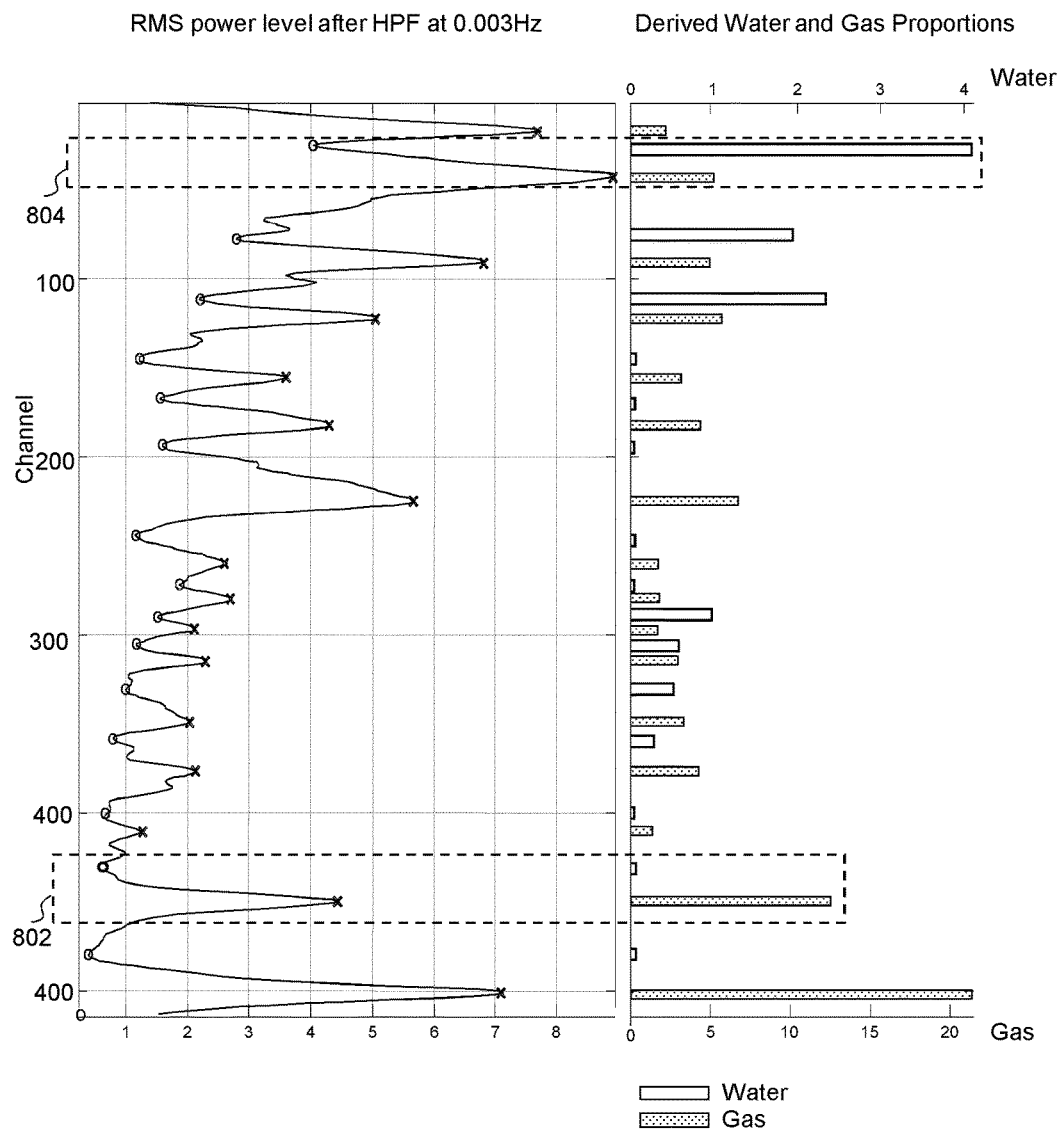

FIG. 8 shows how the proportions of gas and liquid introduced at particular perforations for a given well, using the data first presented in FIG. 7. The peaks and troughs identified and indicative of the gas and water contributions at each perforation can be determined, as shown on the bar chart to the right of FIG. 8. It should be noted that these are not absolute measurements, but are instead proportional contributions (and the gas and water bars are not on the same scale). The absolute values could be obtained by considering actual totals of gas and water production, as will generally be measured at the point of extraction.

A fluid flow velocity profile of the well based on fluid inflow may be determined, noting that the fluid flow velocity at a given point in the well will be approximately proportional to the total rate of fluid entry that occurs at any point further down. Dividing this rate by the cross-section area of the well gives an estimated flow speed, which in turn can be used to provide an estimated fluid flow velocity profile.

As noted above, a separate velocity profile can be formed based on tracking a slug in a well. For example, as slug is rarely in thermal equilibrium with its surroundings, it can tracked by following a disturbance in a temperature profile over time. This is shown schematically in FIG. 9, which shows a 'waterfall' plot, indicating temperatures at various times $t_1$ to $t_5$ over at least a portion of a well. The temperature measurement may be, for example, derived from Rayleigh backscatter at a frequency of interest (which may be at the lower end of the acoustical range, (e.g. 0.3-1 Hz in some wells) or lower). In other examples, a different frequency band may be tracked, and a feature caused by, for example, an acoustic signal indicative of turbulence, pressure or vibration due to a slug could be tracked as the slug moves up the well to provide an indication of slug velocity.

Figure 9:
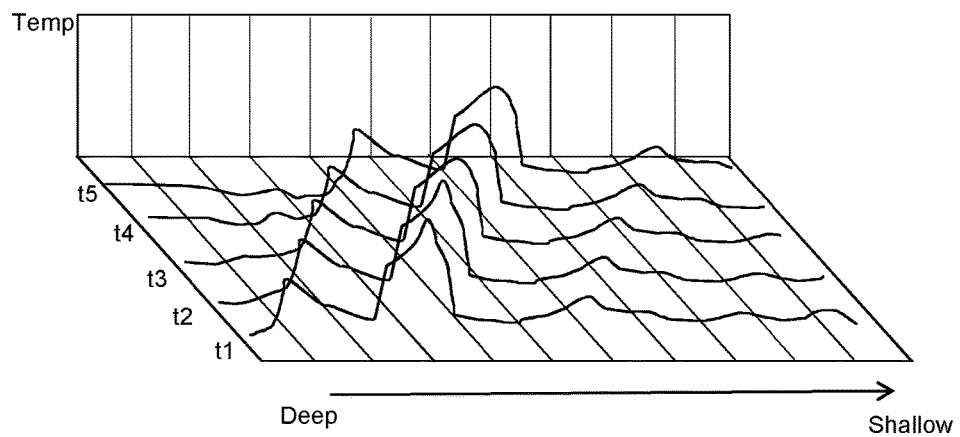

As shown in FIG. 9, the position of the 'disturbance' moves up the well between captured temperature profiles, allowing a slug velocity to be determined, and this can be used to provide a fluid flow velocity profile by equating slug velocity to fluid flow velocity.

In this way, two independent fluid velocity profiles are created: a first from slug tracking and a second from an estimate of inflow.

In an example, the fluid velocity profiles for a portion of the well are considered. For the purpose of example, this is defined using channels of the fibre monitoring system, which equate to physical lengths of fibre, and therefore in this example a length of the well bore (i.e. in this example, the fibre is arranged linearly along the well bore, although other fibre arrangements could also be used). Therefore, in this example, a section of the well corresponding to N channels is selected. A channel may for example correspond to between around 1 and 100 metres of fibre. The slug velocity is obtained by determining how long it takes for the slug to move along the N selected channels. The value of N used in these calculations may be selected bearing in mind that selection of a larger value means that a more accurate value of slug velocity can be calculated but also means that the average speed over a longer distance is obtained, and therefore the precision decreases. In some examples, it may be preferable to select N such that the depth of the well represented by the N channels may be substantially equal or less than the spacing between the perforations although for wells with tightly packed perforations this may not be possible.

In this example, the determined slug velocity is assigned to the central channel in the block of N (i.e. is assumed to be the slug velocity when the slug passes the central channel). The first velocity profile $V_{slug}$ is obtained by repeating this calculation every P channels along the fibre. In an example, P may be around N/2 so that there is a 50% overlap between channels used to calculate successive values of the slug velocity, although other values of P such as N/4 might also be used.

The second inflow profile, $V_{inflow}$ is generated by considering the estimated inflow from each of the perforations in the well. The fluid velocity at any channel is considered to be proportional to the sum of the inflow at all perforations below the depth represented by that channel.

Figures 10A, 10B:
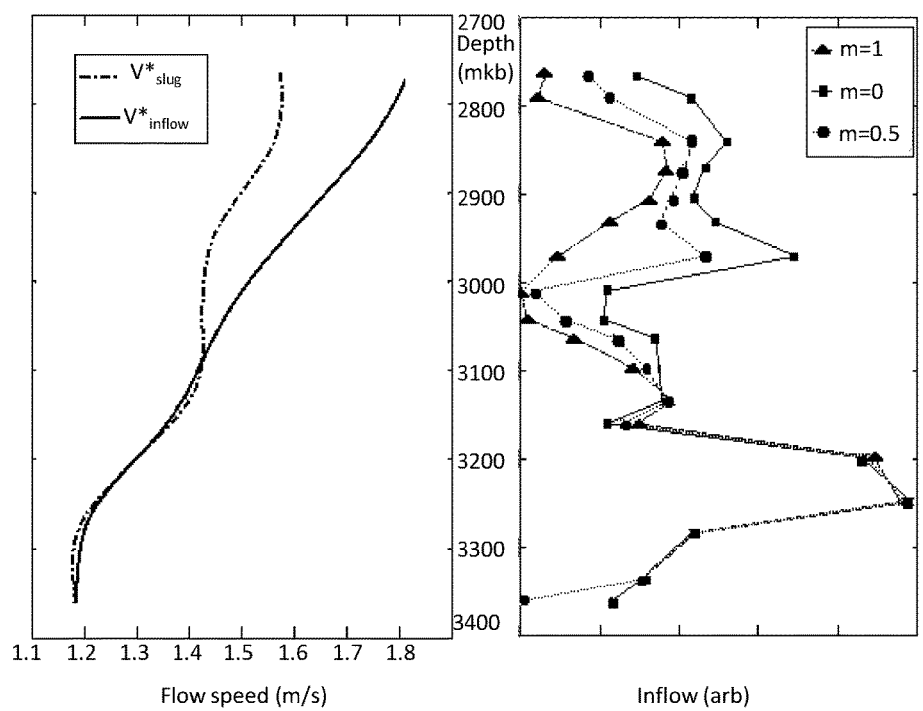

Both profiles are then interpolated to provide intermediate values. The values may have a spacing which is an order of magnitude less than the typical perforation spacing, for example 1 metre spacing (i.e. to give an estimated fluid velocity every metre within the portion of the well under consideration), and the resulting values are subjected to a low pass filter, to smooth the profiles over a length scale that would typically contain a number of perforations. This number of perforations might typically be 3 or 4 although other numbers might also be chosen. The filtered velocity profiles are termed $V^*_{slug}$ and $V^*_{inflow}$ herein. The resulting profiles are shown in FIG. 10A. As can be seen, they agree well in the lower section of the well portion, but diverge over the upper section. It will be appreciated that the filtering process may have little effect (and may therefore be neglected in other examples) on $V_{slug}$, as $V_{slug}$ is already relatively smooth in this example as it is the average velocity over N channels.

A combined velocity profile $V_{combined}$ is then determined, based on the second profile:

$$V_{combined} = V_{inf\,low} \times \frac{[V^*_{slug}]^m}{[V^*_{inf\,low}]^m} \quad \text{eqn. (3)}$$

In this example, the calculation is done on an element by element basis, i.e. each element of an array comprising the interpolated $V_{inflow}$ values is multiplied by the ratio of the corresponding array element in $V^*_{slug}$ and $V^*_{inflow}$ raised to the power of m.

m is a coupling parameter which controls the degree to which $V_{combined}$ is coupled to $V_{slug}$: m=1 provides full coupling so that $V_{combined}$ which be very similar to $V_{slug}$, while m=0 gives no coupling (i.e. in that case $V_{combined}$ is $V_{inflow}$). Therefore, m may be selected based on the relative confidence in $V_{slug}$ and $V_{inflow}$. In some examples, m may be around 0.5. By evaluating $V_{combined}$ bearing in mind the position of the perforations, a difference in velocity may be associated with a particular perforation and used to estimate inflow at that perforation.

FIG. 10B shows the inflow at each perforation that is calculated from $V_{combined}$ for three example values of m. In the lower sections there is little difference between the inflows for the three values of m and this is because, as shown in FIG. 10A, the velocities obtained from slug motion and the inflow are similar. At shallower depths $V^*_{slug}$ is less than $V^*_{inflow}$ indicating that, as the value of m increases, the estimated inflow from each perforation decreases as the $V_{combined}$ becomes more closely coupled to $V^*_{slug}$ rather than $V^*_{inflow}$.

The inflow information calculated as described herein could form part of a well management system, which may consider other factors or measurements.

Variations to the above described embodiments will occur to the skilled person and are within the scope of the invention. For example, while 'DAS' style temperature sensing (i.e. temperature sensing based on Rayleigh backscattering in an unmodified optical fibre) has been described above, any sensing technique which is sufficiently sensitive and reactive to detect flow signals could be used. It will be appreciated that, in the embodiments described, changes of temperature rather than the absolute temperature are of interest. As the 'DAS' techniques described above produce a linear signal indicative of temperature change, it is particularly convenient. However, for example, DTS sensing, in which Raman and/or Brillouin backscattering is detected could be used, and which is indicative of an actual temperature value. Alternatively, thermometers may be positioned within the well, either in place of or to supplement the 'DAS' temperature techniques described herein. As mentioned above, in other examples, other frequency bands (i.e. those indicative of signals which are not primarily thermal signals) may be used to provide the fluid flow velocity profiles, and indeed alternative apparatus may be used.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of determining an indication of fluid inflow in a well, the method comprising:
   determining a first fluid flow velocity profile based on slug tracking; determining a second fluid flow velocity profile from an estimate of fluid inflow at each of a plurality of perforations in the well;
   combining the first and second fluid flow velocity profiles to provide a combined velocity profile;
   deriving, from the combined velocity profile, an indication of fluid inflow at at least one perforation.

2. A method according to claim 1 in which at least one of the first and second fluid flow velocity profiles are smoothed fluid flow velocity profiles.

3. A method according to claim 2 in which combining the first and second fluid flow velocity profiles to provide a combined velocity profile comprises determining a function in which the first velocity profile and a smoothed second velocity profile are coupled, and using the function to act on the second velocity profile.

4. A method according to claim 3 in which a coupling parameter is determined, the coupling parameter determining the degree of coupling between the first and second fluid flow velocity profiles.

5. A method according to claim 1 in which determining the first fluid flow velocity profile comprises determining a flow signal due to a slug as the slug moves though a well.

6. A method according to claim 5 in which determining the flow signal comprises monitoring the signal energy in a frequency band and tracking a feature having a characteristic energy as it moves through the well.

7. A method according to claim 1 in which determining the estimate of fluid inflow comprises determining a signal energy in a frequency band, and relating the signal energy to fluid inflow.

8. A method according to claim 1 in which determining the second fluid flow velocity profile comprises:
    determining a flow signal at a perforation;
    relating the flow signal to an estimated fluid inflow; and
    determining, from the estimated fluid inflow, an estimated fluid flow velocity profile.

9. A method according to claim 8 in which determining the second fluid flow velocity profile comprises:
    monitoring the temperature at a plurality of locations within the section of the well, the locations comprising
    (a) a first set of locations, at or near a perforation; and
    (b) a second set of locations at which the temperature is substantially independent of temperature effects of the inflow of gas at a perforation;
    determining an indication of temperature excursions at the locations;
    obtaining an indication of the inflow of fluids to the well by relating the indications of temperature excursions from the second set of locations to liquid inflow and relating the indications of temperature excursions from the first set of locations to liquid and gas inflow.

10. A method according to claim 9 in which the second set of locations comprise locations between the perforations.

11. A method according to claim 9 in which the inflow of liquid is estimated by considering the indication of temperature excursions at each of the second set of locations as being proportional to:

$$dT_{slug} \times \sum_1^n W_{perf\ n},$$

where $dT_{slug}$ is the temperature difference between liquid rising in the well at that location and the equilibrium temperature at that point, n is the nth perforation in the section of the well, and $$\sum_1^n W_{perf\ n}$$

is the total amount of liquid in the well passing that location.

12. A method according to claim 9 in which the inflow of liquid and gas are estimated by considering the indication of temperature excursions at each of the first set of locations as being proportional to:

$$[dT_{perf\ n} + dT_{slug}] \times \sum_1^n W_{perf\ n},$$

where n is the nth perforation in the section of the well, $dT_{perf\ n}$ is the temperature difference from an equilibrium temperature due to the inflow of gas at perforation n, $dT_{slug}$ is the temperature difference between liquid rising in the well at that point and the equilibrium temperature at that location, and $$\sum_1^n W_{perf\ n}$$

is the total amount of liquid in the well passing that location.

13. A method according to claim 1 wherein the method comprises determining an indication of inflow of liquid and/or gas from at least one perforation.

14. A method according to claim 1 in which the step of monitoring is carried out by monitoring backscatter in an optical fibre.

15. Apparatus for monitoring fluid flow in a section of a well having multiple perforations through which fluid enters the well, comprising:
    an optical fibre, arranged along the length of the well section;
    an interrogator unit arranged to interrogate the fibre with optical radiation and to detect any radiation backscattered within the optical fibre;
    processing apparatus arranged to process the detected signals to:
    determine a flow signal associated with at least one slug moving through the well, and to determine a first fluid flow velocity profile therefrom;
    determine a flow signal associated with fluid inflow at each of a plurality of perforations in the well, and to determine a second fluid velocity profile therefrom, and
    determine a combined velocity profile by combining the first and second fluid velocity profiles.

16. Apparatus according to claim 15 in which the processing apparatus is arranged to derive, from the combined velocity profile, an indication of fluid inflow at at least one perforation.

17. Apparatus according to claim 15 in which the processing apparatus is arranged to provide at least one smoothed first and/or second fluid flow velocity profile.

18. Apparatus according to claim 15 in which the processing apparatus is arranged to combine the first and second fluid flow velocity profiles using a coupling parameter, wherein the coupling parameter determines the degree of coupling between the first and second fluid flow velocity profiles.

19. Apparatus according to claim 15 in which the interrogator unit comprises
    (i) an optical source configured to, in use, launch a series of interrogations, each interrogation comprising a pulse pair, into an optical fibre, wherein the pulses of a pulse pair are introduced to the optical fibre with a time interval therebetween;
    (ii) a sampling detector configured to, in use, sample radiation which is Rayleigh backscattered from within said optical fibre from the interrogations; and the processing circuitry is configured to determine any phase modulation in the samples.

20. Apparatus according to claim 19 in which the processing circuitry comprises at least one bandpass filter arranged to isolate components of the determined phase modulation in a predetermined frequency band.

21. Apparatus according to claim 19 in which the sampling detector is configured to obtain a plurality of samples of backscattered radiation after launch of each pulse pair, and the processing circuitry is arranged to form at least one channel signal comprising samples of the backscatter radiation acquired at substantially the same time after launch of each pulse pair; and said channel signal is demodulated to determine the phase modulation for the channel signal.

22. Apparatus according to claim 15 in which the processing apparatus arranged to determine a second fluid velocity profile by processing the detected signals to determine an indication of temperature excursions at (a) a first set of locations, at or near a perforation and (b) a second set of locations at which the temperature is substantially independent of the effect of inflow of gas at a perforation; wherein the processing circuitry is further arranged to determine an indication of the inflow of fluids to the well by relating the indications of temperature excursions from the second set of locations to liquid inflow and relating the indications of temperature excursions from the first set of locations to liquid and gas inflow.

23. Apparatus according to claim 15 in which the optical source comprises a laser and the processing circuitry is arranged to estimate laser phase noise.

24. Processing apparatus for determining an indication of fluid flow in a well, the apparatus being arranged to:
   determine a first fluid flow velocity profile based on the velocity of at least one slug in the well;
   determine a second fluid flow velocity profile from an estimate of fluid inflow at each of a plurality of perforations in the well;
   combine the first and second fluid flow velocity profiles to provide a combined velocity profile.

* * * * *